US011760925B1

(12) United States Patent
Li et al.

(10) Patent No.: US 11,760,925 B1
(45) Date of Patent: Sep. 19, 2023

(54) OLIGONUCLEOTIDE-CONTAINING TRACER PARTICLES FOR SUBTERRANEAN APPLICATIONS

(71) Applicant: Core Laboratories LP, Houston, TX (US)

(72) Inventors: Feng Li, Missouri City, TX (US); Joshua Charles Falkner, Richmond, TX (US)

(73) Assignee: Core Laboratories LP, Houston, TX (US)

( * ) Notice: Subject to any disclaimer, the term of this patent is extended or adjusted under 35 U.S.C. 154(b) by 0 days.

(21) Appl. No.: 18/117,806

(22) Filed: Mar. 6, 2023

Related U.S. Application Data

(60) Provisional application No. 63/317,217, filed on Mar. 7, 2022.

(51) Int. Cl.
| | |
|---|---|
| *E21B 43/26* | (2006.01) |
| *C09K 8/92* | (2006.01) |
| *C09K 8/70* | (2006.01) |
| *E21B 49/08* | (2006.01) |
| *G01V 8/00* | (2006.01) |
| *G01V 3/26* | (2006.01) |

(52) U.S. Cl.
CPC .......... *C09K 8/92* (2013.01); *C09K 8/70* (2013.01); *E21B 49/08* (2013.01); *G01V 3/26* (2013.01); *G01V 8/00* (2013.01); *C09K 2208/10* (2013.01); *E21B 43/26* (2013.01)

(58) Field of Classification Search
CPC .............. C09K 8/92; C09K 8/70; E21B 43/26
USPC ...................................................... 166/250.12
See application file for complete search history.

(56) References Cited

U.S. PATENT DOCUMENTS

| | | | |
|---|---|---|---|
| 5,929,437 | A | 7/1999 | Elliott et al. |
| 6,543,535 | B2 | 4/2003 | Converse et al. |
| 6,630,947 | B1 | 10/2003 | Lieberman et al. |
| 6,645,769 | B2 | 11/2003 | Tayebi et al. |
| 6,702,023 | B1 | 3/2004 | Harris et al. |
| 7,032,662 | B2 | 4/2006 | Malone et al. |
| 7,196,040 | B2 | 3/2007 | Health et al. |
| 7,287,590 | B1 | 10/2007 | Sullivan et al. |
| 7,347,260 | B2 | 3/2008 | Ferguson et al. |

(Continued)

FOREIGN PATENT DOCUMENTS

| | | |
|---|---|---|
| CN | 112275226 A | 1/2021 |
| GB | 2530970 A | 4/2016 |

(Continued)

OTHER PUBLICATIONS

Gediminas Mikutis, et al., "Silica-Encapsulated DNA-Based Tracers for Aquifer Characterization", Environmental Science & Technology, ACS Publications, 2018 American Chemical Society, Environ. Sci. Technol. 2018, 52, 12142-12152, Zurich, Switzerland, 11 pgs.

(Continued)

*Primary Examiner* — William D Hutton, Jr.
*Assistant Examiner* — Ashish K Varma
(74) *Attorney, Agent, or Firm* — Fletcher Yoder, P.C.

(57) ABSTRACT

A tracer particle includes a silica core and a plurality of polymer-coated oligonucleotides disposed within the silica core, on a surface of the silica core, or a combination thereof. Each of the polymer-coated oligonucleotides comprise a polymer that at least partially surrounds an oligonucleotide.

9 Claims, 6 Drawing Sheets

(56) References Cited

U.S. PATENT DOCUMENTS

| | | | |
|---|---|---|---|
| 7,431,087 B2 | 10/2008 | Sullivan et al. | |
| 8,053,744 B2 | 11/2011 | Bortolin | |
| 8,596,354 B2 | 12/2013 | Hartshorne et al. | |
| 8,703,493 B2 | 4/2014 | Bronchetti et al. | |
| 8,877,506 B2 | 11/2014 | Roberts et al. | |
| 9,023,650 B2 | 5/2015 | Farquar et al. | |
| 9,194,226 B2 | 11/2015 | Blair | |
| 9,206,683 B2 | 12/2015 | Blair et al. | |
| 9,267,371 B2 | 2/2016 | Blair et al. | |
| 9,290,689 B2* | 3/2016 | Lafitte | E21B 47/11 |
| 9,290,810 B2 | 3/2016 | Farquar et al. | |
| 9,303,497 B2 | 4/2016 | Matherly et al. | |
| 9,309,555 B2 | 4/2016 | Swartz et al. | |
| 9,322,056 B2* | 4/2016 | McCann | C12Q 1/686 |
| 9,410,934 B2 | 8/2016 | Robinson et al. | |
| 9,428,792 B2 | 8/2016 | Mercolino et al. | |
| 10,961,444 B1* | 3/2021 | Bestaoui-Spurr | E21B 43/267 |
| 2005/0042604 A1 | 2/2005 | Tong et al. | |
| 2006/0223160 A1 | 10/2006 | Vanzin | |
| 2008/0070809 A1 | 3/2008 | Sullivan et al. | |
| 2008/0268431 A1 | 10/2008 | Choy et al. | |
| 2010/0015612 A1 | 1/2010 | Pelham et al. | |
| 2011/0171749 A1 | 7/2011 | Alocilja et al. | |
| 2011/0214488 A1 | 9/2011 | Rose et al. | |
| 2013/0032333 A1 | 2/2013 | Freese et al. | |
| 2013/0210018 A1 | 8/2013 | Garnett | |
| 2014/0262247 A1 | 9/2014 | Duenckel et al. | |
| 2014/0303895 A1 | 10/2014 | Dreyfus et al. | |
| 2015/0041406 A1 | 2/2015 | Xiao et al. | |
| 2015/0284810 A1 | 10/2015 | Knight et al. | |
| 2015/0292308 A1 | 10/2015 | Conway | |
| 2015/0322776 A1 | 11/2015 | Blair et al. | |
| 2015/0345688 A1 | 12/2015 | Kersey et al. | |
| 2016/0010454 A1 | 1/2016 | Sira et al. | |
| 2016/0075941 A1 | 3/2016 | Duenckel et al. | |
| 2016/0097750 A1 | 4/2016 | Van Herzen et al. | |
| 2016/0115785 A1 | 4/2016 | Blair et al. | |
| 2016/0137904 A1 | 5/2016 | Drake et al. | |
| 2016/0146775 A1 | 5/2016 | Xiao et al. | |
| 2016/0160269 A1 | 6/2016 | McCann et al. | |
| 2016/0186041 A1 | 6/2016 | Bennetzen et al. | |
| 2016/0272882 A1* | 9/2016 | Stray | C09K 8/92 |
| 2016/0290983 A1 | 10/2016 | Kmiecik et al. | |
| 2016/0340569 A1* | 11/2016 | Belcher | C09K 8/584 |
| 2017/0369769 A1 | 12/2017 | Burks et al. | |
| 2017/0370213 A1 | 12/2017 | Knight et al. | |
| 2018/0003690 A1 | 1/2018 | Summers et al. | |
| 2018/0171392 A1 | 6/2018 | McCann et al. | |
| 2021/0130681 A1 | 5/2021 | Yamani et al. | |

FOREIGN PATENT DOCUMENTS

| | | |
|---|---|---|
| WO | 2015193292 A1 | 12/2015 |
| WO | 2016016335 A1 | 2/2016 |
| WO | 2016169904 A1 | 10/2016 |
| WO | 2016187541 A1 | 11/2016 |

OTHER PUBLICATIONS

Dietmar Knopp, et al., "Review: Bioanalytical applications of biomolecule-functionalized nanometer-sized doped silica particles", Analytica Chimica Acta 647 (2009) 14-30, Munich, Germany, 17 pgs.

A. Baker, et al., "Polyethylenimine (PEI) is a simple, inexpensive and effective reagent for condensing and linking plasmid DNA to adenovirus for gene delivery", Gene Therapy (1997) 4, 773-782, 1997 Stockton Press, Edgbaston, UK, 10 pgs.

Se Won Bae, et al., "Fluorescent dye-doped silica nanoparticles: new tools bioapplications", Chem. Commun., 2012, 48, 2270-2282, www.rsc.org/chemcomm, The Royal Society of Chemistry 2012, 13 pgs.

Christina A. Bauer, et al., "A convenient, bio-inspired approach to the synthesis of multi-functional, stable fluorescent silica nanoparticles using ply(ethylene-imine)", Nanoscale Paper, Nanoscale, 2017, 9, 6509, Royal Society of Chemistry 2017, 12 pgs.

Chen-Wen Lu, et al., "Bifunctional Magnetic Silica Nanoparticles for Highly Efficient Human Stem Cell Labeling", Nano Letters 2007 vol. 7, No. 1, 149-154, Published on Web Dec. 6, 2006, 6 pgs.

Tiia-Maaria Ketola, et al., "Independent versus Cooperative Binding in Polyethylenimine-DNA and Ply(L-lysine)-DNA Polyplexes", NIH Public Access, J Phys Chem B. Sep. 12, 2013; 117(36): 10405-10413, 2013 American Chemical Society, 21 pgs.

Juying Lei, et al., "Superbright Multifluorescent Core-Shell Mesoporous Nanospheres as Trackable Transport Carrier for Drug", ACSNANO, vol. 5, No. 5, 3447-3455, 2011, Shanghai, Republic of China, www.acsnano.org, 9 pgs.

R Kircheis, et al., "Polyethylenimine/DNA complexes shielded by transferrin target gene expression to tumors after systemic application", Vienna, Austria, Gene Therapy (2001) 8, 28-40, 2001 Nature Publishing Group, 13 pgs.

Yunhua Yang, et al., "Preparation of Fluorescent SiO2 Particles with Single CdTe Nanocrystal Cores by the Reverse Microemulsion Method", Advanced Materials, 2005, 17, 2354-2357, 2008 WILEY-VCH Verlag GmbH & Co. KgaA, Weinheim, 4 pgs.

Xiaojun Zhao, et al., "Development of Organic-Dye-Doped Silica Nanoparticles in a Reverse Microemulsion", Advanced Materials, Adv. Mater. 2004, 16, No. 2, Jan. 16, 2004, http://www.advmat.de, 2004 WILEY-VCH Verlag GmbHH & Co. KGaA, Weinheim, 173-176, 4 pgs.

PCT International Search Report and Written Opinion; Application No. PCT/US2023/014740; dated May 24, 2023; 12 pages.

* cited by examiner

OLIGONUCLEOTIDE-CONTAINING TRACER PARTICLES FOR SUBTERRANEAN APPLICATIONS

CROSS-REFERENCE TO RELATED APPLICATIONS

This application claims priority to U.S. Provisional Application No. 63/317,217, entitled "OLIGONUCLEOTIDE-CONTAINING TRACER PARTICLES FOR SUBTERRANEAN APPLICATIONS," filed Mar. 7, 2022, the disclosure of which is incorporated by reference herein in its entirety for all purposes.

BACKGROUND

The present disclosure relates generally to a tracer particle that may be utilized for tracking the flow of subterranean fluids (e.g., hydrocarbons and water). More specifically, the present disclosure relates to the manufacture and use of tracer particles for oil and gas exploration, ground water studies, and/or other subterranean flow analysis applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The energy industry frequently engages in subsurface operations to explore and/or extract subterranean resources. Drilling is a process where a borehole, a small diameter hole in the ground, is drilled into the Earth's surface in order to explore and extract energy in the form of hydrocarbons and heat that lie beneath the surface. Before, during, or after the drilling process, geologists may work to determine characteristics of a subsurface formation (e.g., reservoir rock) and the surrounding area. For example, engineers and scientists may work to determine how hydrocarbons or other fluids flow within a subterranean formation. To do so, a unique marker or tracer may be introduced into the subsurface to measure and monitor reservoir characteristics.

However, the subterranean environment within the formation can be extreme in terms of temperature, pressure, acidity, and so forth. As such, certain tracers lack the chemical and physical stability to withstand the subsurface environment. Accordingly, there exists a need for specific tracers that are able to withstand downhole environments while still being relatively easy to detect.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with systems-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more elements. The terms "comprising," "including," and "having" are intended to be inclusive and mean that there may be additional elements other than the listed elements.

Embodiments of the present disclosure are directed toward a tracer particle (e.g., a tracer particle) that may be utilized to determine flow characteristics of fluids (e.g., hydrocarbons, water, natural gas) within a subterranean formation. More specifically, the disclosed tracer particles are able to withstand subterranean environments, which may be high-pressure, high-temperature, high-salt, acidic, or any combination thereof. As discussed below, the tracer particles include negatively-charged oligonucleotides that are coated with positively-charged polymers. A silica core (e.g., a silica nanoparticle) is formed around these polymer-coated oligonucleotides, such that the polymer-coated oligonucleotides are loaded within and/or on the surface of the formed silica cores. In certain embodiments, one or more additional inorganic layers having one or more metal compounds or metal-based nanoparticles (e.g., metal salts, metal nanoparticles, quantum dots) are disposed over the silica particles to provide enhanced methods for protecting, detecting, and/or extracting the tracer particle. In certain embodiments, an outer polymer layer is disposed over the inorganic layers to further enhance chemical stability and improve the solubility of the tracer particles (e.g., stability of the tracer particle in suspension).

Figure 1:
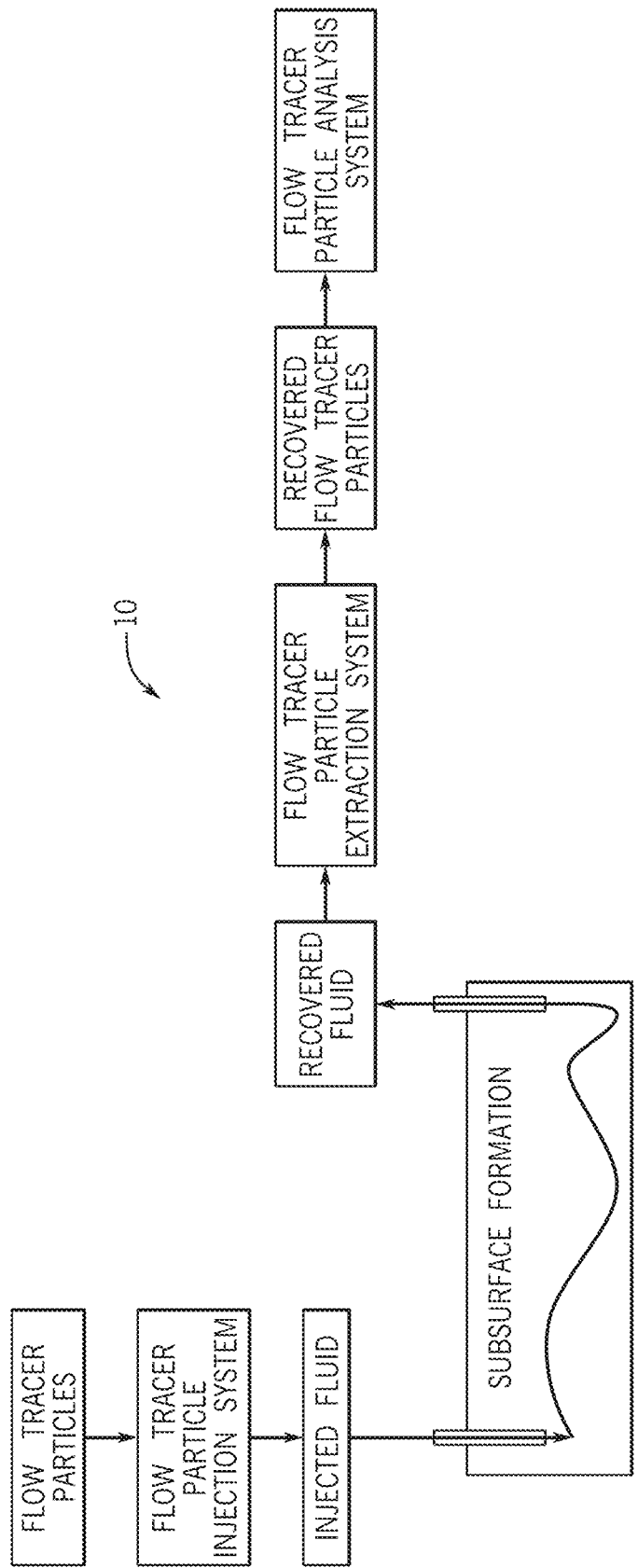
FIG. 1 is a block diagram of a subterranean resource exploration and extraction system, in accordance with aspects of the present disclosure.

Turning to the drawings, FIG. 1 is a block diagram of a subterranean resource exploration and extraction system 10. As illustrated, the subterranean resource exploration and extraction system 10 includes a tracer particle injection system, a tracer particle extraction system, and a tracer particle analysis system. During an operation to explore or extract resources from a subsurface formation, the subterranean resource exploration and extraction system 10 injects a fluid (e.g., a working fluid, a hydraulic fracking fluid, water) into a subsurface formation at a suitable inlet. The fluid is either measured in situ in the subsurface formation or recovered at the surface. The subsurface formation may be an underground formation that includes groundwater or hydrocarbons (e.g., oil, natural gas). As such, the tracer particle described herein may be utilized oil and gas exploration, ground water studies, geothermal energy studies, and/or other subterranean analysis applications.

For the illustrated embodiment, the tracer particle injection system introduces tracer particles into the fluid being injected into the subsurface formation. As discussed below, each of the tracer particles includes at least one oligonucleotide, and the sequence of the oligonucleotide may indicate the identity of a tracer particle. The tracer particles may be dissolved or suspended in a suitable fluid (e.g., a water-based fluid, an organic-based fluid). For applications where the tracer is measuring or monitoring flow, the tracer is injected downhole and at least a portion of the injected tracer particles return with the recovered fluid. The tracer particle detection and/or extraction systems use one or more physical properties (e.g., magnetic properties and optical properties) of the tracer particles to detect and isolate the tracer particles from the remainder of the recovered fluid. For example, the tracer particle extraction/detection system may include centrifuges, magnets, optical excitation and detection devices (e.g., fluorescence microscopes), or any other suitable devices that may be used to detect and/or isolate the tracer particles from the recovered fluid. In some cases, the tracer particles may also be detected in-situ downhole. For example, the presence of the tracer particles may be detected downhole using magnetic sensor, optical excitation/detection devices, or other suitable techniques. Furthermore, while the tracer particle is described as being included in a fluid that is injected into a subsurface formation, it should be noted that the tracer particle may be included in proppant, which may also be introduced to the subsurface formation. For instance, the tracer particle may be included with proppant, which may be added to a fluid (e.g., fracking fluid) before the fluid is introduced into the subsurface formation. Accordingly, the tracer particle may be utilized as a proppant tracer.

After isolation, the recovered tracer particles may advance to the tracer particle analysis system. The tracer particle analysis system includes suitable devices to enable the digestion of the tracer particles to release oligonucleotides from the structure of the tracer particles, as well as suitable devices to analyze the sequence of these released oligonucleotides. For instance, the tracer particle analysis system may include quantitative PCR (qPCR) instruments, deoxyribonucleic acid (DNA) amplifiers, or any other suitable equipment utilized to process or sequence DNA or ribonucleic acid (RNA) (e.g., sequencers, spectrometers, flow cytometers, gel electrophoresis equipment). The tracer particle analysis system may also include one or more computing devices. Since the tracer particle analysis system is capable of determining the sequence of oligonucleotides of tracer particles, the tracer particle analysis system can determine which tracer particles were recovered when multiple tracer particles (e.g., with different oligonucleotide sequences) are injected at different points in the subsurface formation. As such, based on information related to the injection of the tracer particles (e.g., concentration, flow rate, time), and based on the identity of the recovered tracer particles determined from oligonucleotide sequencing and/or other identification methods, the subterranean resource exploration and extraction system 10 can be used to determine information regarding the flow of subsurface fluids (e.g., flow paths, flow rates, flow loss) within the subsurface formation.

Bearing this in mind, it should be noted that the subsurface formation or subsurface fluids may have certain properties or characteristics that may damage oligonucleotides. For example, the environment of the subsurface formation or the subsurface fluids may denature nucleic acids or otherwise damage oligonucleotides. More specifically, the subsurface environment may be high-temperature (e.g., between 40° C. and 200° C.), high-pressure, high-salts, highly acidic, or a combination thereof. Each of these factors (e.g., temperature, pressure, salt, acidity), alone or in combination, may damage oligonucleotides and nanoparticles. As discussed herein, the disclosed tracer particle design includes one or more features that protect the oligonucleotides from being released or degrading under downhole conditions.

Figure 2:
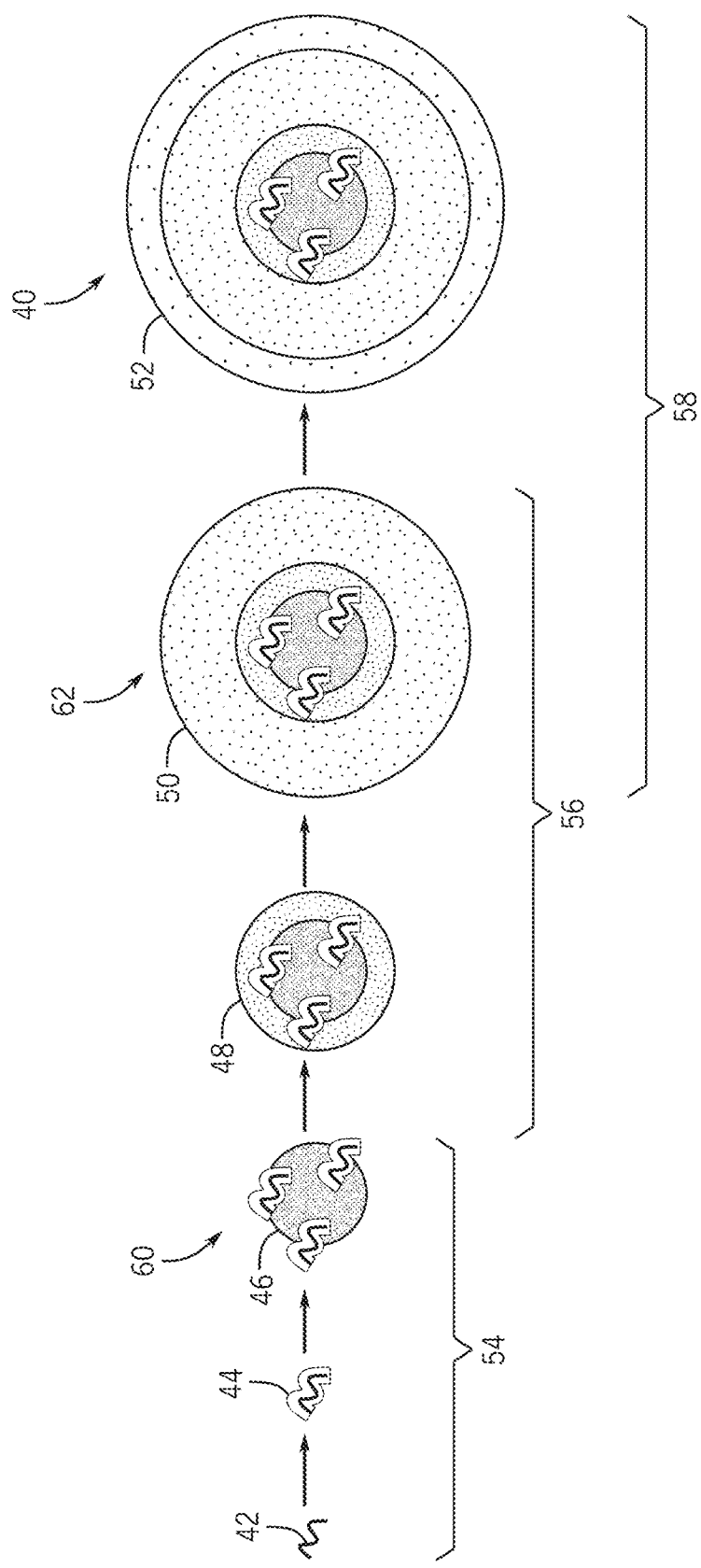
FIG. 2 is a diagram of the synthesis of a tracer particle that may be used by the subterranean resource exploration and extraction system of FIG. 1, in accordance with aspects of the present disclosure.

FIG. 2 is a diagram illustrating an embodiment of a synthesis scheme for an example embodiment of the tracer particle 40. The illustrated tracer particle 40 generally includes negatively-charged oligonucleotides 42, positively-charged polymers that interact with the oligonucleotides 42 (to form polymer-coated oligomers 44), a silica core 46, a metal-containing inorganic layer 48, a silica inorganic layer 50, and an outer polymer layer 52. The tracer particle 40 may be produced using a three-step process that includes a first synthetic step 54, a second synthetic step 56, and a third synthetic step 58. In the first synthetic step 54, negatively-charged oligonucleotides 42 are treated with a positively-charged polymer to generate polymer-coated oligomers 44, and a first intermediate particle 60 is produced that includes these polymer-coated oligomers 44 loaded into and/or onto a silica core 46. In the second synthetic step 56, a second intermediate particle 62 is produced from the first intermediate particle 60, wherein the second intermediate particle 62 also includes additional inorganic layers (e.g., the metal-containing layer 48 and the silica layer 50). In the third synthetic step 58, the tracer particle 40 may be produced from the second intermediate particle 62, wherein the tracer particle 40 also includes an outer polymer layer 52.

Before proceeding to discuss a process for performing the first synthetic step 54 and the second synthetic step 56, it should be noted that, while the present disclosure generally describes using negatively-charged oligonucleotides 42 and positively-charged polymers (e.g., to produce polymer-coated oligomers 44), in other embodiments, other polymers may be utilized. For example, in other embodiments, uncharged (e.g., neutral) or negatively-charged polymers may be utilized instead. As another example, in some embodiments, the charge of the oligonucleotides may be negative relative to the polymer, such as a partial negative charge that may occur for chemical species having at least one dipole moment. As yet another example, the oligonucleotides and the polymer may form hydrogen bonds. For instance, in one embodiment, the oligonucleotides may be hydrogen bond donors, and the polymer may be a hydrogen bond acceptor. In another embodiment, the polymer may be a hydrogen bond donor, and the oligonucleotides may be hydrogen bond acceptors.

Figure 3:
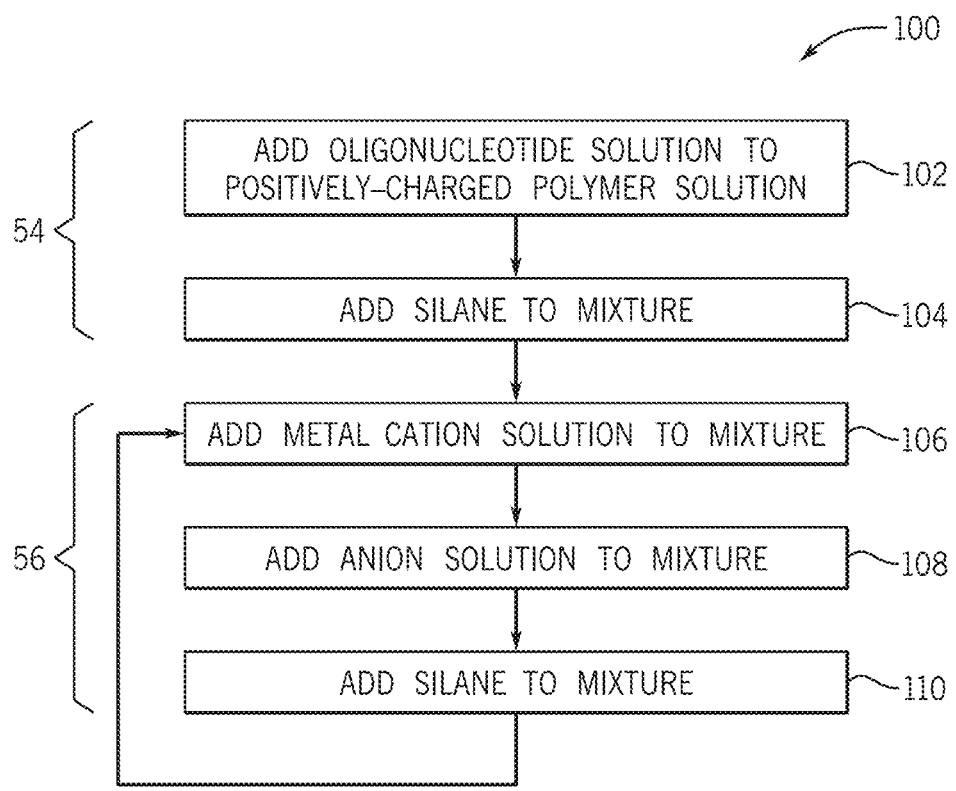
FIG. 3 is a flow diagram of an embodiment of a process for performing the first and second synthetic steps of FIG. 2, in accordance with aspects of the present disclosure.

FIG. 3 is a flow diagram of a process 100 for performing the first synthetic step 54 and the second synthetic step 56 of FIG. 2 during synthesis of the tracer particle 40. As such, the process 100 is discussed with reference to elements illustrated in FIG. 2. For the embodiment of the process 100 illustrated in FIG. 3, at process block 102, a oligonucleotide solution is added to a polymer solution. For example, in one embodiment, a solution that includes one or more negatively-charged oligonucleotides 42 may be added to a solution that includes one or more positively-charged polymers. The oligonucleotides 42 may include DNA or RNA molecules of any suitable number of nucleotides, and the oligonucleotides 42 may be naturally occurring or synthetic. Furthermore, the oligonucleotides 42 may include single-stranded oligonucleotides, double-stranded oligonucleotides, or triple-stranded oligonucleotides. The oligonucleotide solution may include one or more organic solvents (e.g., one or more alkanes, cycloalkanes, alcohols, or a combination thereof), water, oligonucleotides, and one or more surfactants (e.g., non-denaturing detergents such as 4-(5-dodecyl) benzenesulfonate, sodium stearate, cetrimonium bromide, palmitoyl-oleoyl-sn-phosphatidylcholine (POPC), octylphenoxypolyethoxyethanol, one or more alcohols (e.g., ethanol, hexanol, 2-ethyl-1-hexanol or other branched alcohols). In one embodiment, the ratio (by weight percent) of solvent to surfactant to water to oligonucleotide in the oligonucleotide solution may be 12,500-27,500 to 3,000-6,000 to 500-1000 to 1. The polymer solution may include polymers, one or more organic solvents (e.g., one or more alkanes, cycloalkanes, alcohols, or a combination thereof), water, and one or more surfactants. For example, in some embodiments, the solvent(s) and surfactant(s) of the polymer solution may be the same as those included in the oligonucleotide solution, while in other embodiments, the solvent(s), surfactant(s), or both may be different than those included in the oligonucleotide solution. The polymers may include branched polymers, linear polymers, or a combination of branched and linear polymers. In one embodiment, the polymers may have molecular weights of 10,000 Daltons or greater. In other embodiments, the molecular weights of the polymers may be less than 10,000 Daltons, greater than 10,000 Daltons, or a combination thereof. Additionally, in one embodiment, the ratio (by weight percent) of solvent to surfactant to water to polymer may be 150-325 to 37.5-80 to 5.5-11.5 to 1, and the total volume of the polymer solution may be approximately twice the volume of the oligonucleotide solution. The polymers may have hydroxy, amine, carboxy groups, or any combination thereof. For instance, the polymers may include poly(vinyl alcohol) (PVA), polyacrylic acid (PAA), polyethylenimine (PEI), polylysine (PLL), or any combination thereof. The polymers may serve as a reagent that forms complexes (e.g., micelles) with the oligonucleotides 42, and the polymers may also protect the oligonucleotides 42 for the formation of the complexes. For example, the negatively-charged oligonucleotides 42 may be surrounded by molecules of the positively-charged polymers due to interactions between the oligonucleotides 42 and the polymers to form the polymer-coated oligonucleotides 44. The ratio of positively-charged polymers to oligonucleotides 42 may range from 0.5:1 to 100:1.

For the embodiment of the process 100 illustrated in FIG. 3, at process block 104, at least one silane is added to the mixture. A silane is generally a silicon-based compound that includes a silicon atom with four substituents. For example, the silanes may include one or more compounds that having one or more alkoxy substituents. For instance, the silanes may include one or more orthosilicates, which may include, but are not limited to, tetraalkyl orthosilicates (e.g., tetramethyl orthosilicate (also known as TMOS), tetraethyl orthosilicate (also known as tetraethoxysilane (TEOS)), N-Methyl-3-(trimethoxysilyl)propylamine (TMAP), tetrapropyl orthosilicate, or tetraalkyl orthosilicates that include larger alkoxy constituents, such as alkoxy groups that have more than three carbon atoms) and orthosilicates having three alkyl or alkoxy groups (e.g., tris(2-methoxyethoxy)vinylsilane). By volume, the amount of silanes used may be three to twelve times the amount of polymer included in the polymer solution.

When the polymer-coated oligomers 44 are combined with the silane, the first intermediate particle 60 is formed, in which the polymer-coated oligomers 44 are integrated into the volume of, and/or onto the surface of, the silica core 46. For example, the condensation of the silane may produce silica, which forms the silica core 46 of the first intermediate particle 60 from the complexes. The first intermediate particle 60 may include varying amounts of the oligonucleotides 42. The size of the first intermediate particle 60 depends at least in part on the reaction time, as well as the amounts of silane, polymer-coated oligomers 44, and surfactants utilized. For example, the relatively higher the amounts of silane and polymer used, as well as the longer the reaction is allowed to take place, the larger the intermediate particles 60 will be. In certain embodiments, ammonia hydroxide solution (28%) may be added into the reaction to catalyze the condensation of silane. The size of the first intermediate particle 60 may also depend at least in part on the amount of water used when performing the reaction. In certain embodiments, the first intermediate particle 60 is generally between 45 nanometers (nm) and 100 nm in diameter.

Figure 4:
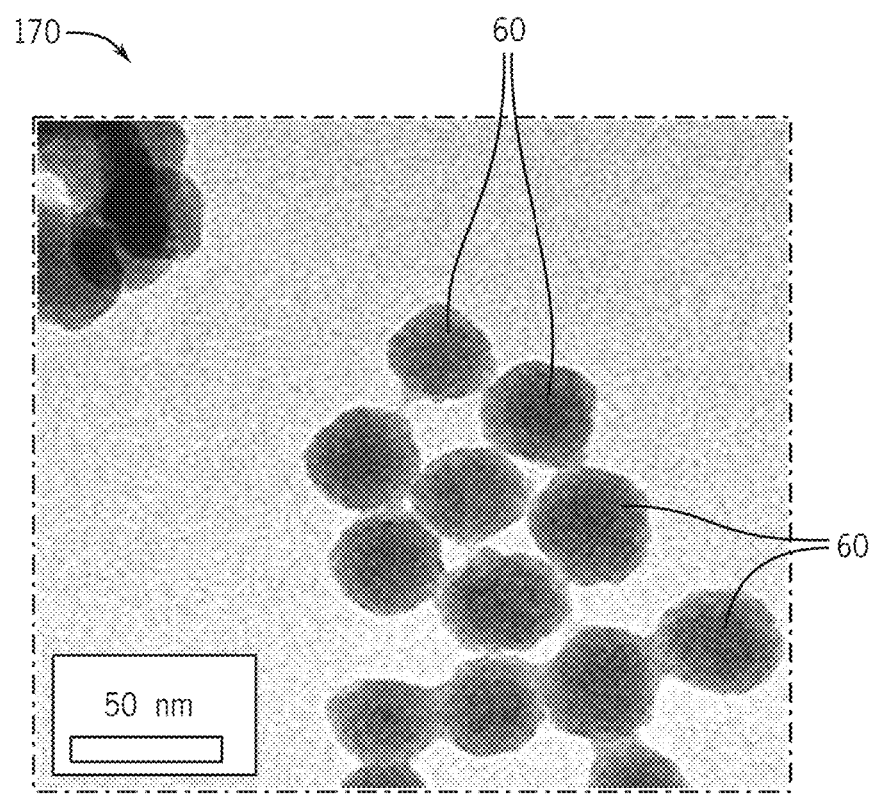
FIG. 4 is a transmission electron microscopy (TEM) micrograph showing embodiments of a second intermediate particle, in accordance with aspects of the present disclosure, in accordance with aspects of the present disclosure.

FIG. 4 is a transmission electron microscopy (TEM) micrograph 170 showing an embodiment of the first intermediate particles 60 produced following the first synthetic step 54. As shown, the first intermediate particles 60 are generally spherical micelles or ellipsoids. As noted above, the oligonucleotides may be disposed within the first intermediate particles 60, on the surface of the first intermediate particles 60, or a combination thereof.

Returning briefly to FIG. 2, at the second synthetic step 56, additional inorganic layers are added to the first intermediate particle 60 to generate the second intermediate particle 62. These additional inorganic layers may provide additional features for detecting and/or isolating the tracer particle 40 via magnetic and/or photoluminescent properties, and may also provide additional protection to the oligonucleotides 42 of the tracer particle 40 to survive the downhole environment. These additional inorganic layers may include at least one metal-bearing layer 48 and at least one silica layer 50. In certain embodiments, the additional inorganic layers 48 and 50 may be added to the first intermediate particles 60 by performing the operations associated with process blocks 106, 108, 110 of the process 100 of FIG. 3. As illustrated in FIG. 3, in certain embodiments, these steps may be repeated to form even more inorganic layers of the tracer particle 40.

For the embodiment of the process 100 illustrated in FIG. 3, at process block 106, a metal cation solution may be added to the mixture. For example, in certain embodiments, the metal cation solution may be added to the same container as used when performing process blocks 102, 104. The metal cation solution may include a metal salt (e.g., a metal salt solution), one or more organic solvents, and one or more surfactants. The solvent(s) and surfactant(s) may be the same as those described above with respect to the oligonucleotide solution and polymer solution. In certain embodiments, the metal cation may be selected from: cobalt (Co), zinc (Zn), copper (Cu), manganese (Mn), nickel (Ni), copper (Cu), cadmium (Cd), barium (Ba), magnesium (Mg), iron (Fe), chromium (Cr), and aluminum (Al). Various metallic salts such as, but not limited to, metal halides (e.g., fluorides, chlorides, bromides, iodides), metal sulfates, and metal nitrates may be dissolved to form the metal ion solution. In one embodiment, the molar ratio of solvent to surfactant to metal salt may be 2000-4000 to 150-450 to 1.

For the embodiment of the process 100 illustrated in FIG. 3, at process block 108, an anion solution is added to the mixture. The anion solution may include one or more solvents, one or more surfactants, and a water solution with salt having a suitable anion to react with the metal cation at the surface of the first intermediate particle 60. The solvent(s) and surfactant(s) may be those discussed above with respect to the oligonucleotide solution and polymer solution. The salt used to form the anion solution may include a metasilicate ($SiO_3^{2-}$) salt, an orthosilicate ($SiO_4^{4-}$) salt, a phosphate ($PO_4^{3-}$) salt, a borate ($BO_3^{3-}$) salt, or any other suitable salts. For example, among other things, the salt may be a metal silicate (e.g., a metasilicate or metal orthosilicate), metal phosphate, or metal borate, in which the metal is sodium or potassium. In the reaction mixture, the anions from the anion solution react with the metal cations from the metal ion solution at the surface of the first intermediate particles 60 to form metal salts that make up the metal-bearing layer 48, in certain embodiments. For example, the metal-bearing layer 48 may include metal metasilicates ($MSiO_3$), metal orthosilicates ($MSiO_4$), metal phosphates ($M_3(PO_4)_2$), metal borates ($M_3(BO_3)_2$), or a combination thereof, with M being copper ($Cu^{2+}$), cobalt ($Co^{2+}$), manganese ($Mn^{2+}$), nickel ($Ni^{2+}$), cadmium ($Cd^{2+}$), magnesium ($Mg^{2+}$), iron ($Fe^{2+}$), zinc ($Zn^{2+}$), or a combination thereof. The metal-bearing layer 48 may also include metal orthosilicates ($M'_2(SiO_4)_3$), metal phosphates ($M'PO_4$), metal borates ($M'BO_3$), with M' being iron ($Fe^{3+}$), chromium ($Cr^{3+}$), or aluminum ($Al^{3+}$), or a combination thereof. In one embodiment, the molar ratio of solvent to surfactant to salt may be 2000-4000 to 150-450 to 1.

In certain embodiments, the metal-bearing layer 48 may additionally or alternatively include nanoparticles having one or more metals or metal-containing compounds, such as magnetic nanoparticles and/or quantum dot nanoparticles. In certain embodiments, these nanoparticles may be formed in situ at the surface of the first intermediate particle 60, similar to the metal salts discussed above, while in other embodiments, the nanoparticles may be separately formed and loaded onto the surface of the first intermediate particle 60. For example, in certain embodiments, the metal-bearing layer 48 may include one or more magnetic nanoparticles, such as metal ferrites having the formula $MFe_2O_4$, where M is iron ($Fe^{2+}$), manganese ($Mn^{2+}$), cobalt ($Co^{2+}$), nickel ($Ni^{2+}$), zinc ($Zn^{2+}$), or copper ($Cu^{2+}$). By including a magnetic nanoparticle in the metal-bearing layer 48, the resulting tracer particle 40 may be more easily recovered from the fluid that has traversed the subsurface formation using magnetic fields.

In certain embodiments, the metal-bearing layer 48 may additionally or alternatively include one or more nanoparticles that are quantum dots. Examples of quantum dots include, but are not limited to: cadmium sulfide (CdS), cadmium selenide (CdSe), zinc sulfide (ZnS) and zinc selenide (ZnSe), or any combination thereof. It may be appreciated that, while quantum dots are electrically classified as semiconductors, they are described herein as metal-containing, in that the quantum dots include at least one metal element (e.g., Cd, Zn). Utilizing quantum dots in the metal-bearing layer 48 may enable the resulting tracer particles 40 to be easily detected on drilling site in a particular volume of the recovered fluid using fluorescence analysis equipment, and then additional techniques can be applied to isolate the tracer particles 40 from the particular volume. Additionally, in certain embodiments, different quantum dots can be included in different tracer particles 40 that are used in combination within the subsurface formation, and the recovered fluid may be analyzed using fluorescence microscopy to quickly determine which of the different tracer particles are present in a particular volume of the recovered fluid. It is presently recognized that this optical analysis can provide more rapid preliminary identification of tracer particles than oligonucleotide sequencing.

For the embodiment of the process 100 illustrated in FIG. 3, at process block 110, silanes may be added to the mixture. The silanes may include one or more particular silanes, such as, but not limited to, one or more of the silanes described above (e.g., with respect to process block 104). In one embodiment, the molar ratio of silanes to salt (i.e., the salt included in the anion solution) may be 10-200 to 1. In some embodiments, catalysts (e.g., ammonium hydroxide ($NH_4OH$)) may be also added with the one or more silanes to catalyze the reaction. By performing process block 110, the silica layer 50 may be formed around the metal-bearing layer 48, thereby resulting in the second intermediate particle 62 that includes at least two inorganic layers (e.g., the silica layer 50 and metal-bearing layer 48) that surround or encapsulate the first intermediate particle 60. The diameter of the second intermediate particle 62 may generally depend on the amount of time allowed to pass after the silane is added, as well as the amount of silane added, at process block 110. For instance, allowing more reaction time, adding relatively higher quantities of silane, or both may increase the size of the second intermediate particles 62. In certain embodiments, the second intermediate particle 62 may have a diameter that ranges from 80 nanometers to 350 nanometers.

Figure 5:
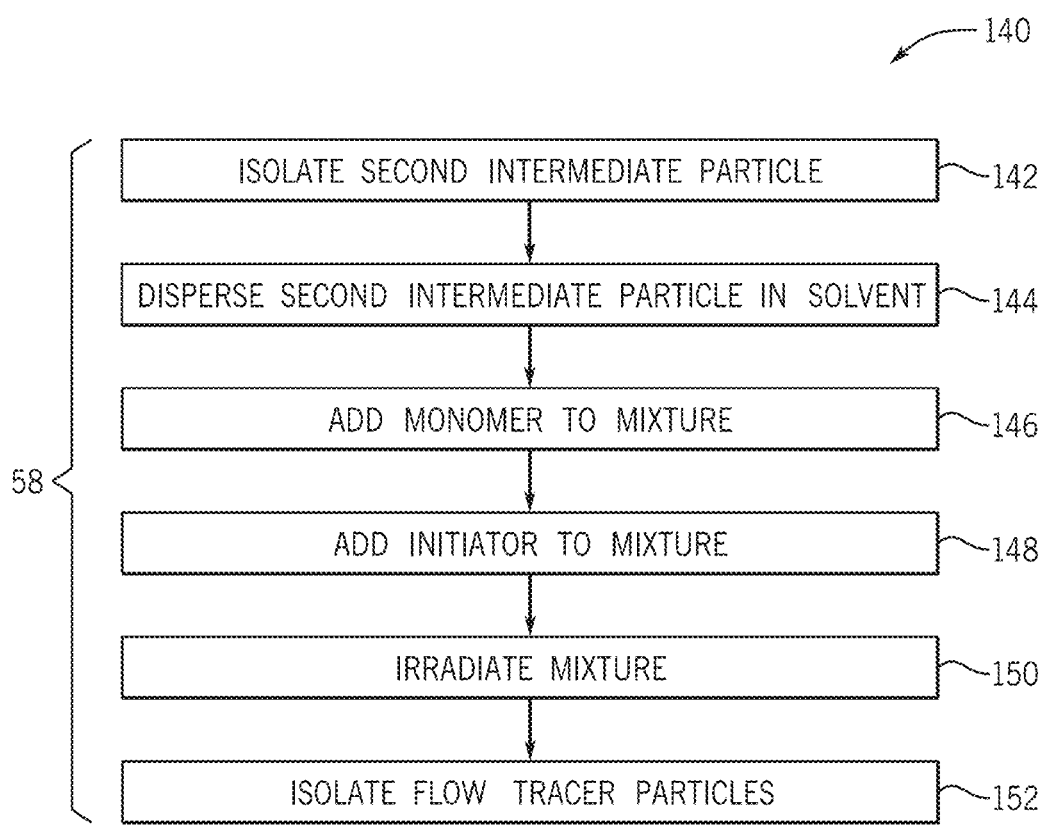
FIG. 5 is a flow diagram of an embodiment of a process for performing the final synthetic step of FIG. 2.

Returning to FIG. 2, in certain embodiments, the second intermediate particle 62 may be coated with the polymer layer 52 (e.g., a negatively-charged polymer layer) to further improve the stability of the tracer particle 40 to the downhole environment. For example, the polymer layer 52 may be added to the second intermediate particles 62 to form the tracer particles 40. FIG. 5 is a flow diagram illustrating an embodiment of a process 140 whereby the second intermediate particle 62 is coated with the polymer layer 52 to form the tracer particle 40, which corresponds to step 58 in the synthesis scheme of FIG. 2.

For the embodiment of the process 140 illustrated in FIG. 5, at process block 142, the second intermediate particles 62 are isolated from the resulting mixture at the conclusion of the process 100 of FIG. 3. The second intermediate particles 62 may be isolated using any suitable technique, such as centrifugation or filtration. For embodiments in which the second intermediate particles 62 include a metal-bearing layer 48 having magnetic nanoparticles, the second intermediate particles 62 may be isolated using a magnet. At process block 144, the isolated second intermediate particles 62 are dispersed into a solvent. The solvent may include an organic solvent, such as a suitable organic alcohol solvent or a hydrophilic solvent. Examples of alcohols that may be used as solvents include, but are not limited to, methanol, ethanol, propanol, and butanol. Examples of hydrophilic solvents that may be used include, but are not limited to, water, dimethyl sulfoxide (DMSO), and dimethylformamide (DMF).

For the embodiment of the process 140 illustrated in FIG. 5, at process block 146, a monomer may be added to the mixture of solvent and the second intermediate particle 62. The monomer may generally be a carboxylic acid or, more specifically, an unsaturated carboxylic acid. Examples of monomers that may be used at process block 146 include, but are not limited to, acrylic acid, substituted forms of acrylic acid (e.g., methacrylic acid), crotonic acid, isocrotonic acid, 3-butenoic acid, or other organic acids with one or more vinyl groups that may be utilized to form polymers. At process block 148, an initiator is added to the mixture of the second intermediate particle 62, the solvent, and the monomer. The initiator is a compound that, when suitably exited, causes the monomer added at process block 146 to form polymers. For example, the initiator may include a radical initiator, such as 2,2'-azobis(2-methylpropionitrile), which is also known as azobisisobutyronitrile (AIBN). In other embodiments, the initiator may include metal iodides, metal alkyls, or azo compounds other than AIBN. In one embodiment, the molar ratio of monomer to initiator to salt (i.e., the salt included in the anion solution) may be 150-325 to 1-3 to 1.

Figure 6:
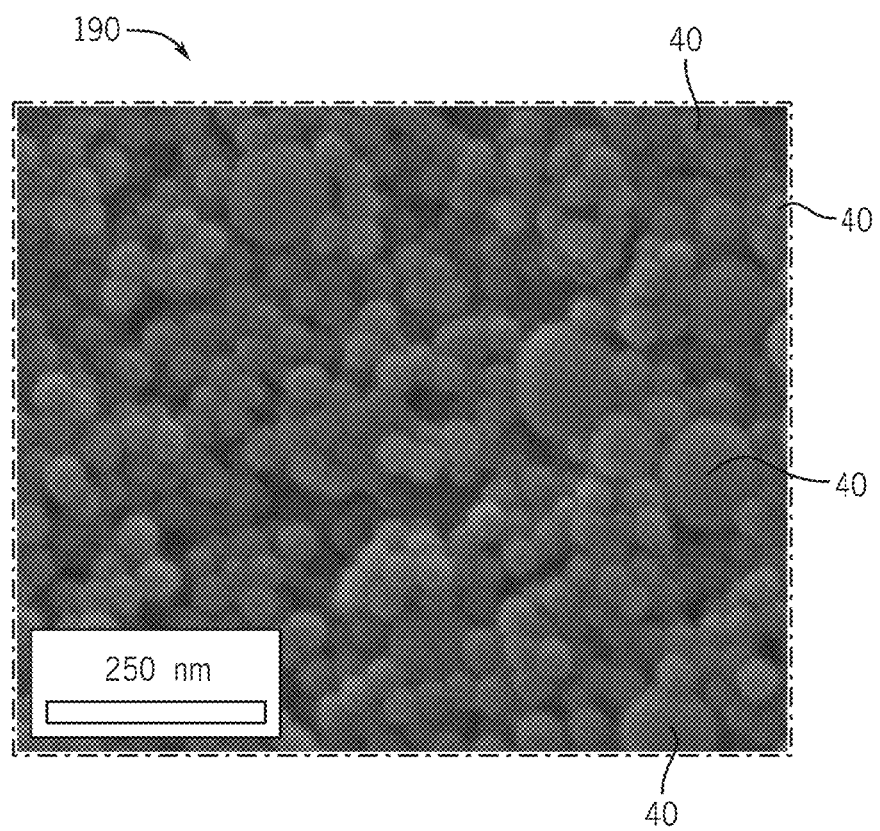
FIG. 6 is a scanning electric microscope (SEM) micrograph showing an embodiment of the tracer particle, in accordance with aspects of the present disclosure.

For the embodiment of the process 140 illustrated in FIG. 5, at process block 150, the mixture of the second intermediate particle 62, the solvent, the monomer, and the initiator is irradiated or heated. More specifically, the mixture may be irradiated with ultraviolet light (UV), which may cause photolysis of the initiator, producing radicals that enable free-radical polymerization of the monomer to occur. The radicals initiate polymerization of the monomer added at process block 146. For example, in the case of the monomer being acrylic acid, molecules of the acrylic acid polymerize to form polyacrylic acid chains on the surfaces of the second intermediate particle 62, thereby forming the polymer layer 52 of the tracer particle 40. In one embodiment, the tracer particle 40 has a diameter ranging from forty to 500 nanometers. For example, FIG. 6 is a SEM micrograph 190 showing the tracer particles 40 produced following the techniques described herein. As shown in the micrograph 190, the tracer particles 40 are generally spherical micelles or ellipsoids that may vary in size.

Returning to FIG. 5, the polymer layer 52 of the tracer particle 40 may enhance the protection of the oligonucleotides 42, as well as enhance the solubility (e.g., dispersibility, suspension stability) of the tracer particle 40 in fluids, such as water or organic solvent. For example, at process block 152, the tracer particle 40 may be isolated from the mixture. Additionally, in certain embodiments, the tracer particle 40 may be loaded into a water-based or organic solvent-based suspension to prepare the tracer particle 40 for injection.

After being synthesized, the tracer particles 40 may be dispersed into a fluid, such as solvent or combination of solvents, including, but not limited to a hydrophilic solvent (or solvents), a hydrophobic solvent (or solvents), or a combination thereof. The solution that includes that solvent (s) and the tracer particles 40 may be injected into subsurface formations, for example, using a pump. After the tracer particles 40 have been in the formation for a desired amount of time (e.g., several days, weeks, or months), water/oil samples can be collected at a production well. The oligonucleotides 42 included in the tracer particles 40 may be extracted from samples, and the oligonucleotides may be analyzed using techniques such as, but not limited to, qPCR and next-generation sequencing (NGS).

As described in detail above, present embodiments include a tracer particle that may be utilized to determine information regarding the flow of fluids (e.g., hydrocarbons or water) in a subsurface formation. The tracer particle includes oligonucleotides that may be recovered by digesting the tracer particles and then sequenced to enable positive identification of the tracer particle. The tracer particle includes complexes of oligonucleotides and polymers coated with one or more inorganic layers, such as a silica layer and a metal-bearing layer having metal salts, magnetic nanoparticles, and/or quantum dots. Additionally, in certain embodiments, the tracer particles include an outer polymer layer that further protects the oligonucleotides and enhances the solubility of the tracer particle in a particular hydrophobic or hydrophilic fluid for injection. The various and multiple layers of the tracer particle protect the oligonucleotides from degrading (e.g., denaturing) while in high-pressure conditions, high-temperature conditions, and/or acidic conditions, each of which may be present in the subsurface formation. Accordingly, the present embodiments enable robust tracer particles to be synthesized, injected with a fluid into a subsurface formation, recovered from the fluid, and characterized for positive identification.

This written description uses examples to disclose the present embodiments, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
adding a plurality of tracer particles into a fluid, wherein each of the plurality of tracer particles comprises:
a silica core; and
a plurality of polymer-coated oligonucleotides disposed within the silica core, on a surface of the silica core, or a combination thereof, wherein each of the polymer-coated oligonucleotides comprises polymers that at least partially surround an oligonucleotide;
after adding the plurality of tracer particles into the fluid, introducing the fluid into a subterranean formation; and
after introducing the fluid into the subterranean formation, detecting a presence of the plurality of tracer particles.

2. The method of claim 1, wherein detecting the presence of the plurality of tracer particles comprises detecting the presence of the plurality of tracer particles within the subterranean formation.

3. The method of claim 2, wherein detecting the presence of the plurality of tracer particles comprises detecting the presence using a magnetic sensor.

4. The method of claim 2, wherein detecting the presence of the plurality of tracer particles comprises detecting the presence via an optical sensor.

5. The method of claim 1, comprising:
collecting a sample from the subterranean formation, the sample comprising at least a portion of the plurality of tracer particles; and
isolating the portion of the plurality of tracer particles from the sample.

6. The method of claim 5, comprising:
isolating oligonucleotides from the portion of the plurality of tracer particles; and
identifying the oligonucleotides.

7. The method of claim 6, wherein identifying the oligonucleotides comprises sequencing the oligonucleotides or a portion thereof.

8. The method of claim 5, comprising determining a flow of subsurface fluids within the subterranean formation based on identifying the oligonucleotides.

9. The method of claim 1, wherein the fluid comprises a fracking fluid.

* * * * *